2,703,798

DETERGENTS FROM N-MONOALKYL-GLUCAMINES

Anthony M. Schwartz, Washington, D. C., assignor to Commercial Solvents Corporation, Terre Haute, Ind., a corporation of Maryland No Drawing. Application May 25, 1950, Serial No. 164,286

10 Claims. (Cl. 260—211)

The present invention relates to detergents from N-monoalkylglucamines. More particularly, it relates to the production of detergents by condensing an aliphatic ester of a fatty acid with an N-monoalkylglucamine.

The N-monoalkylglucamines have previously been condensed with fatty acids and with acid anhydrides. Insofar as I have been able to determine, however, it was not known that such condensation products were useful as detergents. During the course of the experimentation which led to the present invention, I discovered that such compositions possess detergency properties but of a materially reduced degree as compared to the similar properties possessed by the compositions produced in accordance with my invention. The primary condensation products produced by the reaction of N-monoalkylglucamines and fatty acids or acid anhydrides not only possess lower detergency properties but are also subject to the added disadvantage of having undesirable color characteristics unless subjected to special purification processes.

The present invention is based on the discovery that by condensing an N-monoalkylglucamine with an aliphatic ester of a fatty acid I obtain a condensation product which is far superior in detergency properties to the condensation products of the prior art even without any purification. The products of my new process can be used as detergents competitively with the commercial detergents now in use without any purification. In addition, the products resulting from my new process are of a light, unobjectionable color.

While I do not wish to be limited to any particular theory of operation, it is believed that the superiority of the detergents made by my new process over those made by the prior art processes can be explained on the basis of possible impurities produced by the latter. Thus, according to my new process only one reaction takes place:

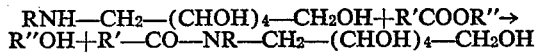

When an acid is condensed with an N-alkyl glucamine the following reactions occur:

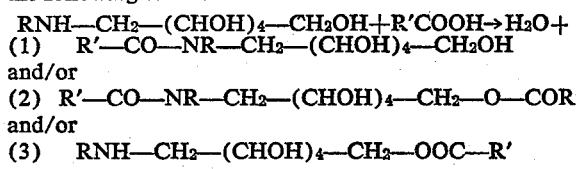

The second compound (2) is inert and waxy, impairing the surface activity of compound (1).

The third compound (3) is a cationic compound (forms a cation containing the elongated low-affinity portion of the molecule in aqueous solution) and therefore renders hard surfaces hydrophobic. While no method has been devised for precise determination, present indications are that a product resulting from condensation of a fatty acid with an N-alkylglucamine may contain about 5% of compound (3), which can be separated from compound (1) only with difficulty and the presence of which materially reduces the detergency properties of the condensation product from N-monoalkylglucamine and a fatty acid or acid anhydride.

In accordance with the process which comprises my invention I prefer to mix about 1 part of a suitable alkyl ester of a fatty acid with slightly more than 1 part of an N-alkylglucamine, in any suitable reaction vessel. The mixture is then heated, by any suitable means, to a temperature of about 160–180° C. In the initial stage the reaction mixture consists of two phases, a lower phase of molten alkylglucamine and an upper phase of the fatty alkyl ester. As the reaction proceeds, these phases gradually merge and form one phase. A period of about one hour is required for completion of the condensation. However, it is usually desirable to continue heating for a short time after formation of the single phase in order to insure complete reaction.

The fatty alkyl esters used in my process can be conveniently prepared by reacting a suitable fatty acid with an aliphatic alcohol. For this purpose any fatty acid having from 6 to 30 carbon atoms in the molecule can be used. However, to obtain condensates having particularly outstanding detergent properties I prefer to use a fatty acid containing between 10 and 18 carbon atoms. The ester for use in my process can be prepared with any aliphatic alcohol, but preferably with a lower aliphatic alcohol containing less than about 7 carbon atoms in the molecule. Mono or poly hydroxy alcohols can be used.

While the preceding paragraph describes one method of obtaining the fatty alkyl esters used in my process, it will be understood that I am not limited to that method nor to the esters prepared thereby. One of the greatest advantages of my process arises out of the fact that I can employ naturally occurring esters. Particularly suitable are the so-called fatty oils or triglycerides of fatty acids. These esters occur naturally as cocoanut oil, soybean oil, palm oil, castor oil, animal fats, peanut oil, cottonseed oil, linseed oil, and the like. The more common of these triglycerides hydrolize to fatty acids having from about 6 to about 18 carbon atoms per molecule.

The N-monoalkylglucamines suitable for use in my process include all those wherein the alkyl group contains from 1 to about 8 carbon atoms. The N-monoalkylglucamine used in my process can be conveniently prepared by heating glucose and a primary alkylamine in the presence of hydrogen and a hydrogenation catalyst under pressure. As examples of N-alkylglucamines which can be used may be mentioned N-methylglucamine, N-ethylglucamine, N-isopropylglucamine, N-butylglucamine, and the like.

While I prefer to carry out the condensation using a ratio of about one mole of ester to slightly more than one mole of N-monoalkylglucamine, it will be understood that my process is not limited to this mole ratio.

The condensation comprising the present invention can be carried out at any temperature within the range of about 140–230° C. However, I prefer to operate within the temperature range of about 160–180° C. The reaction can be carried out at atmospheric or superatmospheric pressure. Reduced pressure can also be used, sometimes advantageously. The reaction mixture should be agitated throughout the reaction period to insure thorough mixing of the reactants.

An aliphatic alcohol is liberated as a product of the reaction between the ester and the N-alkylglucamine. This alcohol, provided it is sufficiently volatile at the reaction temperature, can be removed from the reaction vessel as it is formed, to be subsequently condensed and recovered, or it can be refluxed back into the reaction mixture. When natural fats are used, the glycerol formed does not boil off at the temperature of the reaction, and must be subsequently separated.

The product remaining after the ester phase and the amine phase have merged into a single phase is an excellent detergent and is useful as such. However, I have found that the detergency of these products can be increased appreciably if heating of the homogenous mass is continued for some time after the single reaction phase has been formed.

A better understanding of the nature of my invention can be had by reference to the following examples.

EXAMPLE I

Two-tenths of a mole of the methyl ester of lauric acid and .22 mole of N-methylglucamine were placed in an open flask fitted with a thermometer and an efficient agitator, and heated by an oil bath to 170° C. In the initial state the reaction mixture consisted of two phases, a lower phase of molten N-methylglucamine and an upper phase of the methyl ester of lauric acid. As the reaction proceeded, these phases gradually merged and formed one phase. The merger required a period of about 1 hour, during which time methanol vapors were continuously liberated from the mixture. Heating was continued for 45 minutes after the single phase was formed in order to insure complete reaction. The lauric amide of N-methylglucamine produced by this experiment was found to be an excellent detergent without the necessity of purification.

EXAMPLE II

One mole of Manila oil consisting of mixed glycerides of fatty acids in about the following proportions: Caprylic and capric—15%, lauric—45%, myristic—25%, palmitic, stearic and oleic—15% was heated with 1.2 moles of N-methylglucamine to 170–175° C. After about two hours the mixture, which was originally in two phases, became homogeneous. At the end of four hours the reaction was stopped. The product, a mixture in corresponding proportions of the fatty acid amides of N-methylglucamine, was an excellent detergent.

EXAMPLE III

Cochin oil (having approximately the same glyceride composition as the Manila oil of Example II) was substituted for the Manila oil in Example II. The product of this condensation, a mixture consisting chiefly of the caprylic, capric, lauric, myristic, palmitic, stearic and oleic amides of N-methylglucamine, together with glycerol, was lighter in color and had detergency performance characteristics similar to the product from Manila oil.

EXAMPLE IV

One gram molecular equivalent of commercial cochin cocoanut oil (calculated as equivalent to one-third mole of the lauric ester of glycerol) and 1.1 mole of pure N-methylglucamine were mixed and heated with stirring at 175° C. After about 1 to 1½ hours the molten mixture, which was originally present in the form of two liquid phases, became completely homogeneous and formed a one phase system. Heating was continued for ½ hour longer at 180° C. The product appeared to be completely formed at this stage and was tested without further purification or processing. After cooling it formed a soft waxy mass of light tan color, completely soluble in water to form a typical surface active solution.

EXAMPLE V

Following the procedure of Example IV, 1.1 moles of pure N-isopropylglucamine were reacted with one gram molecular equivalent of cochin cocoanut oil. The product of this reaction was an excellent detergent.

EXAMPLE VI

A series of experiments were run in order to compare the soil removal efficiency of condensates prepared according to my new method and the corresponding condensates prepared according to the prior art method of condensing a fatty acid with an N-alkylglucamine. The condensation products were prepared under the conditions shown in Table I. The products were then tested for soil removal efficiency on cotton and wool.

The detergency tests to which the products were subjected are widely used and well recognized by technologists who have specialized in this field. They consist in washing swatches of standard soiled fabrics under controlled conditions with a standard solution of the detergent in a Launder-O-Meter instrument, and estimating the degree of soil removal by means of a photometer. In these tests a 10 minute washing interval and a temperature of 50° C. were used. The woolen and cotton fabrics were soiled according to the directions given by Crowe in American Dyestuff Reporter, 32, page 237 (1943).

Table I

| Detergent (0.2% aqueous solution) | Mole ratio amine/ester or acid | Temp. of condensation, °C. | Soil Removal Efficiency | |
|---|---|---|---|---|
| | | | Wool, Percent | Cotton, Percent |
| Condensation Product of Lauric acid ester with IGL [1] | 1.33 | 175–185 | 64.6 | 12.5 |
| Do | 1.1 | 160–180 | 60.4 | 22.3 |
| Condensation Product of Lauric acid with IGL [1] | 1.26 | 185–200 | 46.1 | 7.3 |
| Do | 1.1 | 170 | 34.9 | 3.9 |
| Do | 1.16 | 170–200 | 14.3 | 1.3 |
| Condensation Product of CFA [2] ester with IGL [1] | 2.0 | 156–175 | 57.0 | 15.3 |
| Do | 1.5 | 165–185 | 53.8 | 11.8 |
| Do | 1.1 | 170–190 | 54.0 | 12.2 |
| Condensation Product of CFA [2] with IGL [1] | 1.1 | max. 170 | 31.8 | 6.9 |

[1] Isopropylglucamine.
[2] Coconut fatty acid.

One of the desirable characteristics of a cleaned hard surface (dishes, paint, glassware, metal surfaces, etc.) is that the water should drain from it in an even, unbroken film without forming hanging water droplets. A detergent which conditions a hard surface in this manner is said to confer good "water break." Water break is not necessarily connected with cleanliness (absence of dirt or grease) but depends on whether the surface is left in a hydrophilic or hydrophobic condition. This in turn probably depends on the nature and orientation of absorbed monomolecular layers of the detergent. Cationic detergents are notorious for having very poor water break. A glass plate washed in a cationic detergent and then rinsed thoroughly with water may be perfectly clean, but the water will hang on it in droplets just as if the plate were greased. This effect is very undesirable from the psychological viewpoint and is also disadvantageous because it prevents rapid air drying.

To my knowledge there is no widely accepted quantitative manner of specifying water break. Accordingly, I have devised the following test which affords an accurate comparison. When a mixture, such as a fatty condensate of an N-monoalkylglucamine and a known cationic compound, are used to wash a clean glass plate, there are two competing forces at work. The condensate tends to make the glass surface hydrophilic and the cationic compound to make it hydrophobic. My testing procedure consists of mixing the detergent being tested with a known cationic compound and determining what percent of cationic compound is required to overcome the hydrophilic action of the detergent.

In Table II the products prepared in Examples IV and V are compared with corresponding condensation products from cocoanut fatty acid and N-methylglucamine (product IVA) and N-isopropylglucamine (product VA) prepared by condensing, under the conditions of Experiments IV and V, respectively, free cocoanut fatty acid with N-methylgulcamine and N-isopropylglucamine.

Table II

| Detergent | Cationic required, percent |
|---|---|
| IV | 50 |
| IVA | 20 |
| V | 55 |
| VA | 15 |

I claim:

1. A detergent composition comprising the reaction products obtained by reacting an aliphatic ester of a fatty acid having from 6 to 30 carbon atoms with an N-monoalkylglucamine containing from 1 to 8 carbon atoms in its alkyl group in about equimolecular proportions at temperatures between about 140° to 230° C. until a homogeneous mass having detergent properties is produced.

2. The detergent composition of claim 1 wherein the reaction products are obtained by continuing the heating beyond the formation of a homogeneous mass and until maximum solubility and detergent power is developed in the reaction mass.

3. The detergent composition of claim 1 wherein the N-monoalkylglucamine is N-methylglucamine.

4. The detergent composition of claim 1 wherein the N-monoalkylglucamine is N-ethylglucamine.

5. The detergent composition of claim 1 wherein the N-monoalkylglucamine is N-isoproplyglucamine.

6. A detergent composition comprising the reaction products obtained by reacting an aliphatic ester of a volatile alcohol and of a fatty acid having from 6 to 30 carbon atoms with an N-aminoalkylglucamine containing from 1 to 8 carbon atoms in its alkyl group in about equimolecular proportions at temperatures between about 140° to 230° C. until a homogeneous mass is obtained, distilling off the volatile alcohol produced in the reaction and recovering the resulting mass having high detergent properties.

7. A detergent composition comprising the reaction products obtained by mixing together and reacting in substantially equimolecular proportions and at a temperature of from about 140° to 230° C. an N-monoalkyl-glucamine having from 1 to 8 carbon atoms in its alkyl group and a naturally occurring fatty oil, until a homogeneous mass having high detergent properties is obtained.

8. The detergent composition of claim 7 wherein the fatty oil is coconut oil.

9. The detergent composition of claim 7 wherein the fatty oil is Manila oil.

10. The detergent composition of claim 7 wherein the fatty oil is cottonseed oil.

References Cited in the file of this patent
UNITED STATES PATENTS

| | | |
|---|---|---|
| Re. 21,530 | Kritchevsky | Aug. 13, 1940 |
| 1,985,424 | Piggott | Dec. 25, 1934 |
| 2,071,250 | Carothers | Feb. 16, 1937 |
| 2,089,212 | Kritchevsky | Aug. 10, 1937 |
| 2,238,928 | Cahn et al. | Apr. 22, 1941 |